US005972166A

United States Patent [19]

Helwig et al.

[11] Patent Number: 5,972,166

[45] Date of Patent: Oct. 26, 1999

[54] NON-WOVEN FIBER MAT AND METHOD FOR FORMING SAME

[75] Inventors: Gregory S. Helwig; W. Scott Miller, both of Newark; Kimberley A. Householder, Pickerington, all of Ohio

[73] Assignee: Owens Corning Fiberglass Technology, Inc., Summit, Ill.

[21] Appl. No.: 09/000,772

[22] Filed: Dec. 30, 1997

Related U.S. Application Data

[60] Division of application No. 08/619,029, Mar. 20, 1996, Pat. No. 5,935,879, which is a continuation-in-part of application No. 08/310,183, Sep. 21, 1994, Pat. No. 5,885,390, and application No. 08/609,071, Feb. 29, 1996, abandoned.

[51] Int. Cl.[6] .................................................... D21H 11/00

[52] U.S. Cl. .......................... 162/109; 162/152; 162/156; 162/157.1; 162/157.2

[58] Field of Search .................................... 162/109, 152, 162/156, 157.1, 157.2

[56] References Cited

U.S. PATENT DOCUMENTS

| | | |
|---|---|---|
| Re. 34,357 | 8/1993 | Eckert et al. . |
| 4,175,154 | 11/1979 | Faust et al. . |
| 4,849,281 | 7/1989 | Brandon et al. . |
| 5,080,944 | 1/1992 | Kaufman et al. . |
| 5,393,379 | 2/1995 | Parrinello . |

*Primary Examiner*—Richard Weisberger
*Attorney, Agent, or Firm*—Stephen W. Barns

[57] ABSTRACT

The present invention is a non-woven fiber mat suitable for reinforcing resilient sheet floor coverings, such as vinyl floor coverings. The non-woven fiber mat is in the form of a sheet of reinforcement fibers which at least includes semi-coiled fibers and can also include coiled fiber, with one or more turns, and even some relatively straight or slightly curved fibers. It is desirable for most, if not all, of the reinforcement fibers to be made from glass. However, it may also be desirable for the reinforcement fibers to include glass fibers and synthetic fibers. It may even be possible for the reinforcement fibers to include only non-glass fibers. At least one polymeric binder is used for bonding together the reinforcement fibers so as to make the fiber mat a suitable substrate for reinforcing resilient sheet floor coverings, such as an interlayer for vinyl floor coverings. By using a non-woven fiber mat containing reinforcement fibers that are not completely straight and capable of interlocking with one another, a resilient sheet floor covering made with such a mat can exhibit improved planar compressibility.

6 Claims, 2 Drawing Sheets

NON-WOVEN FIBER MAT AND METHOD FOR FORMING SAME

CROSS-REFERENCE TO RELATED APPLICATION

The present application is a division of U.S. patent application Ser. No. 08/619,029, filed Mar. 20, 1996, now U.S. Pat. No. 5,935,879, which application was a continuation-in-part of U.S. patent application Ser. No. 08/310,183, filed Sep. 21, 1994, now U.S. Pat. No. 5,885, 390, and entitled PROCESSING METHODS AND PRODUCTS FOR IRREGULARLY SHAPED BICOMPONENT GLASS FIBERS, and of the U.S. patent application Ser. No. 08/609,071, filed Feb. 29, 1996, now abandoned entitled METHOD OF FORMING AN IMPREGNATED FIBROUS MATERIAL, both of which are assigned to the assignee of the present application.

TECHNICAL FIELD

The present invention is related to fibrous mats used for reinforcing resilient sheet floor coverings, more particularly, to a non-woven fiber mat which allows a resilient sheet floor covering a degree of planar compressive movement and, even more particularly, to such a compressible mat for use as a reinforcing interlayer in vinyl floor coverings.

BACKGROUND ART

Resilient sheet floor coverings, such as vinyl floor coverings are widely used in residential construction. A vinyl floor covering, as used in Europe, is typically composed of a number of layers including a wear layer, a print/foam layer, a glass mat layer and a backing layer. The wear layer is typically polyurethane and provides the hard, abrasion-resistant surface required for good durability. The print/foam layer carries the decorative print and is chemically foamed and embossed. The glass fiber layer is typically a mat in the range of 35 $g/m^2$ to 60 $g/m^2$ produced with a suitable binder material. The backing layer is vinyl film typically having the same mass as the print/foam layer. The backing layer may be solid or foamed and completely encapsulates the glass mat.

Unlike the floor coverings produced with felt or paper carriers, the glass mat provides a dimensionally-stable substrate for coating and printing operations during production of the floor covering. Felt backed vinyl floor coverings are often adhered to the floor surface. The use of the reinforcing glass mat as an interlayer yields a floor covering that resists curling, making the floor covering suitable for loose-lay installations. In addition, the interlayer construction is very flexible, making do-it-yourself installation readily possible.

Vinyl floor coverings containing such an interlayer of glass fiber mat have been widely used in Europe. However, the use of an all glass fiber mat as a reinforcing layer in vinyl floor coverings has not been widely accepted in this country, because of the difference in building construction techniques. Concrete subfloors are prevalent in Europe while wood subfloor systems are more widely employed in the United States. The relative dimensional stability of such glass fiber reinforced vinyl floor coverings is desirable when installed over concrete, but may cause problems when installed over a wood subfloor. Wood subfloors exhibit relatively large dimensional changes in response to temperature and humidity changes. In winter time, wood subfloors tend to dry out, shrinking the wood by as much as 0.5%. Unless the floor covering is able to compress (i.e., shrink) along with this dimensional change in the subfloor, the floor covering may respond by buckling.

Prior glass fiber mats used to reinforce vinyl floor coverings have typically been very stiff and have exhibited a high resistance to planar compressive movement. A typical reinforcing mat used as an interlayer in vinyl floor coverings is made with glass textile fibers having a diameter in the range from 9 to 11 microns and a length of 6 mm. These fibers are typically held together by a rigid polymeric binder, such as a urea-formaldehyde resin or poly(vinyl alcohol). The high compressive stiffness of these glass reinforcing mats is not substantially altered during the manufacturing of the floor covering.

U.S. Pat. No. 4,849,281 discloses one potential solution to the problem of the high compressive stiffness exhibited by such glass fiber reinforcing layers. The glass fiber mat disclosed in this patent is a blend of mostly glass wool fibers with a balance of glass textile fibers. These glass fibers are bonded with a crosslinked styrene-butadiene elastomeric binder that is softened by the plasticizers in the vinyl coatings. The combination of mostly short, friable, glass wool fibers and the rubbery binder permit a substantial amount of compressive movement in the corresponding floor covering. This compressibility, in turn, may reduce the chance of buckling when the floor covering is installed over a wood subfloor.

Even though the glass fiber mat disclosed in U.S. Pat. No. 4,849,281 provides one potential solution to the problem of high compressive stiffness, there is a continuing need for more commercially acceptable fiber mats capable of providing resilient sheet floor coverings with even better planar compressibility.

DISCLOSURE OF INVENTION

This need is satisfied by providing a non-woven fiber mat suitable, according to the principles of the present invention, for reinforcing resilient sheet floor coverings, such as vinyl floor coverings. A method is also provided for producing such a fiber mat, according to the principles of the present invention. At one stage of its production, the present fiber mat may be a non-woven wet-laid base web or mat. This base mat may comprise a plurality of reinforcement fibers combined in the form of a sheet. It is desirable for most, if not all, of the reinforcement fibers to be made from glass. However, it may also be desirable for the reinforcement fibers to include glass fibers and synthetic fibers. The term glass, as used herein, is intended to include any of the glassy mineral materials, such as rock, slag and basalt, as well as traditional glasses. The term synthetic fiber, as used herein, is intended to include any man-made fiber having suitable reinforcing characteristics including fibers made from suitable polymers such as, for example, polyesters, polyolefins, nylons, aramids, poly(phenylene sulfide), and suitable non-glass ceramics such as, for example, silicon carbide (SiC) and boron nitride.

One or more binders may be used to bind the reinforcement fibers together in the form of a sheet so as to at least enable the base mat to be subsequently processed in-line or wound into a roll for subsequent off-line processing into the present non-woven fiber mat. The binders which may be used with the base mat include thermoplastic-type polymeric binders. These binders can be in particle form (e.g., poly (vinyl alcohol) powder), fiber form (e.g., made from a vinyl chloride copolymer or a copolyester) or a combination of both. These binders are at least partially fused to bond to the reinforcement fibers.

The present invention is predicated, at least in part, upon the discovery that improved planar compressibility in a resulting resilient sheet floor covering can be obtained by using a non-woven fiber mat containing reinforcement fibers that are not completely straight and are capable of interlocking with one another. In the past, only relatively straight fibers have been used. Satisfactory results have been obtained using reinforcement fibers that include both coiled fibers and semi-coiled or looped fibers. It is believed that at least some improvement over prior fiber mats may be obtained by using at least semi-coiled fibers for all or a substantial part of the reinforcement fibers. The reinforcement fibers that are coiled or otherwise semi-coiled (i.e., have curved sections) appear to function as a collection of small springs. At least when it is incorporated into a resilient sheet floor covering, the fiber mat containing these spring-like fibers resists planar elongation and yet allows a greater degree of planar compressive movement than that exhibited by prior fiber mats.

At the final stage of production, the present non-woven fiber mat may be in the form of a sheet of reinforcement fibers, which include at least the semi-coiled fibers. At least one polymeric binder is used for bonding together the reinforcement fibers so as to make the fiber mat a suitable substrate for reinforcing resilient sheet floor coverings, such as an interlayer for vinyl floor coverings. It is desirable for the fiber mat to have reinforcement fibers which include coiled fibers, with each of the coiled fibers having a coil with at least one coil turn. It is also desirable for the semi-coiled fibers and the coiled fibers to be randomly or irregularly disposed throughout the sheet.

Satisfactory results have been obtained by using reinforcement fibers that are formed by chopping or otherwise cutting irregularly shaped glass fibers, such as those disclosed in U.S. Pat. No. 5,431,992, into shorter discrete lengths to produce coiled fibers, semi-coiled fibers and even some relatively straight or slightly curved fibers. It is believed that irregularly or randomly shaped fibers made from non-glass materials which have suitable reinforcing characteristics can also be used to make acceptable reinforcement fibers. Suitable non-glass materials may include synthetic materials, such as high temperature engineering thermoplastic-type and thermoset-type polymers, as well as non-glass ceramic materials. It is also believed that these non-glass irregularly shaped fibers can be used instead of or in addition to the irregularly shaped glass fibers. Other fibers that may be used to supplement the reinforcement fibers formed from such irregularly shaped fibers include relatively straight synthetic fibers, textile glass fibers, and glass wool fibers.

The polymeric binder may include a preliminary binder to at least bind the reinforcement fibers together to enable the sheet to be subsequently processed into a fiber mat. The polymeric binder may also include a secondary binder to bond together the reinforcement fibers to provide the fiber mat with substantial resistance to planar elongation and yet still allow a substantial degree of planar compressive movement. Alternatively, the polymeric binder can be a single binder suitable for so bonding together the reinforcement fibers.

In another aspect of the present invention a method is provided for producing the above-described fiber mat according to the present invention. In one method, each of a plurality of irregularly shaped fibers are chopped or otherwise separated into randomly shaped fibers of irregular lengths, for example, ranging from about 0.5 inches (12.7 mm) to about 2.0 inches (50.8 mm). Some of these randomly shaped fibers are coiled, with one or more turns, while others are only semi-coiled or relatively straight (i.e., slightly curved). The reinforcement fibers are provided in the form of a slurry which includes at least the randomly shaped fibers. The slurry is dewatered or otherwise formed into a non-woven wet-laid base mat of the reinforcement fibers. At some point in the process, at least one thermoset-type or thermoplastic-type binder is applied to the reinforcement fibers. The wet-laid base mat is dried, and the binder is cured by either causing the thermoset-type binder to crosslink and/or allowing the thermoplastic-type binder to solidify, whichever is applicable, to form the non-woven fiber mat. The drying and curing steps can occur simultaneously or at different times.

As one way of obtaining the irregular shape of the fibers, this method can also include the step of forming the plurality of irregularly shaped fibers from at least two different glasses having different coefficients of thermal expansion, such as according to the teachings in U.S. Pat. No. 5,431,992. In addition to a step of forming the plurality of irregularly shaped fibers from at least two different glasses, the method can include chopping or otherwise separating each of a plurality of different type reinforcement fibers into a plurality of shortened fibers. These other type reinforcement fibers can include synthetic fibers, textile glass fibers and glass wool fibers. It is desirable for any combination of these reinforcement fibers to be mixed in as part of the slurry.

In one embodiment to the present method, the step of applying a binder to the reinforcement fibers can include providing at least one thermoplastic-type preliminary binder in the slurry, where the thermoplastic-type binder is in the particle form, fiber form or both. The thermoplastic-type binder can be heated, for example, during the step of drying the wet-laid mat, so as to at least partially fuse the thermoplastic-type binder to the reinforcement fibers. If necessary, a secondary thermoplastic-type and/or thermoset-type binder can be applied to the reinforcement fibers, either before or after the wet-laid mat is initially dried. The step of drying the wet-laid mat can include drying the mat at least after the secondary binder is applied. The step of drying the wet-laid mat can also include waiting until after the secondary binder is applied to dry the mat. The step of curing the binder can include causing a thermoset-type binder to crosslink and allowing a thermoplastic-type binder to solidify.

One or more binders can be applied to the reinforcement fibers by being directly applied to the mat, rather than mixed in with the slurry, before or after the mat is dried. The binder system used is suitable for bonding together the reinforcement fibers such that the fiber mat is substantially resistant to planar elongation and yet allows a substantial degree of planar compressive movement in the fiber mat, at least when the fiber mat is incorporated as an interlayer in a resilient sheet flooring.

The objectives, features, and advantages of the present invention will become apparent upon consideration of the detailed description and the appended drawings.

MODES FOR CARRYING OUT THE INVENTION

Although the present invention is herein described in terms of specific embodiments used in the production of vinyl floor coverings, it will be readily apparent to those skilled in this art that various modifications, re-arrangements, and substitutions can be made without departing from the spirit of the invention. The scope of the present invention is thus only limited by the claims appended hereto.

Figure 1:
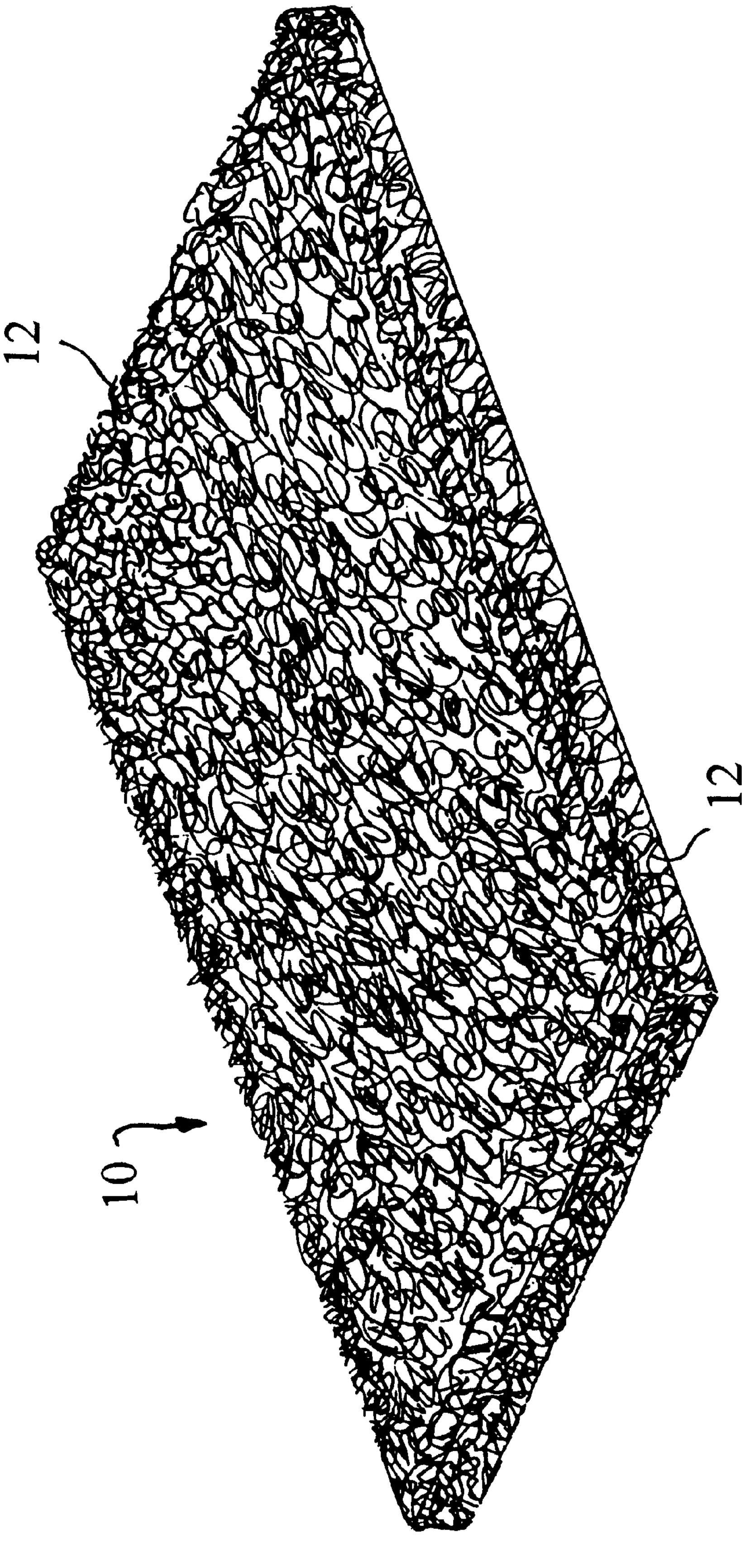
FIG. 1 is a perspective view of a non-woven fiber mat according to one embodiment of the present invention.

Referring to FIG. 1, in one embodiment of the present invention, a non-woven glass fiber mat 10 is provided which is particularly useful as an interlayer in an otherwise conventional vinyl floor covering. The exemplary fiber mat 10 is composed entirely of reinforcement fibers 12 made of glass or, as indicated in the alternative examples below, a blend of fibers 12 made from glass and fibers 12 made from an appropriate synthetic or non-glass material. The term glass, as used herein, is intended to include any of the glassy mineral materials, such as rock, slag and basalt, as well as traditional glasses. The term synthetic, as used herein, is intended to include any man-made material having suitable reinforcing characteristics including fibers made, for example, from a polyester, an arramed, a poly(phenylene sulfide) and other suitable polymers, and silicon carbide (SiC)

Figure 2:
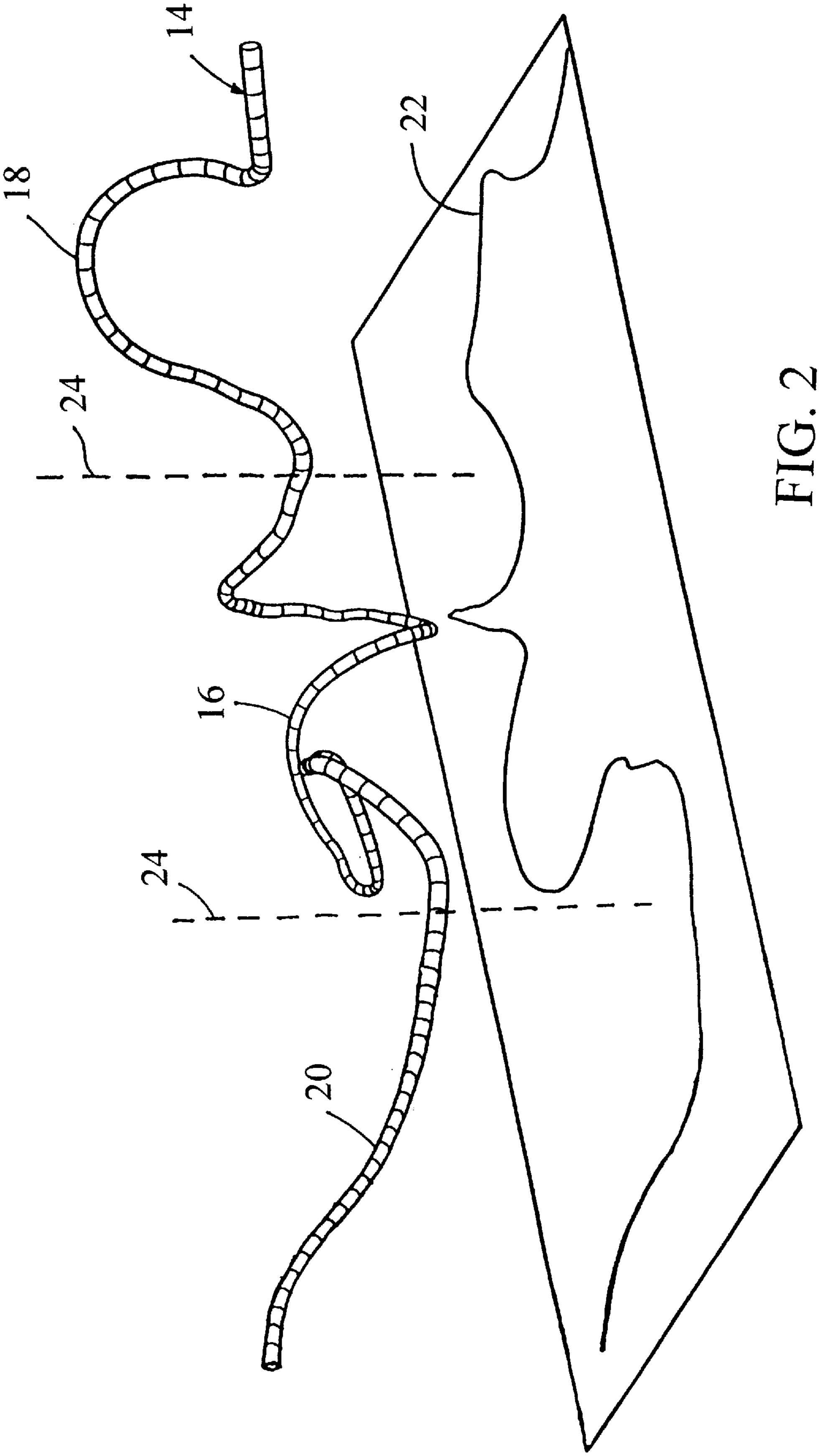
FIG. 2 is a schematic perspective view of one of a plurality of irregularly shaped glass fibers used in accordance with one embodiment of the present invention to produce the non-woven fiber mat of FIG. 1.

Satisfactory fiber mats 10 have been obtained by using reinforcement fibers 12 that are formed by chopping or otherwise cutting irregularly shaped glass fibers 14 into shorter discrete lengths to produce coiled fibers 16, semi-coiled fibers 18 and even some relatively straight or slightly curved fibers 20. A section of a representative irregularly shaped long glass fiber 14 is shown in FIG. 2, along with its two-dimensional projection shadow 22, which illustrates the irregular shape or rotation along its length. Such irregularly shaped long glass fibers 14, as well as a process for making such fibers, are disclosed in U.S. Pat. No. 5,431,992 and U.S. patent application Ser. No. 08/310,183, filed Sep. 21, 1994 and entitled PROCESSING METHODS AND PRODUCTS FOR IRREGULARLY SHAPED BICOMPONENT GLASS FIBERS, both of which are incorporated herein by reference in their entirety, The section of the irregularly shaped fiber 14 shown in FIG. 2 is divided into a representative coiled fiber 16, semi-coiled fiber 18 and slightly curved fiber 20 by imaginary cut lines (indicated by phantom lines 24).

Each of the glass reinforcement fibers 12, made from the irregularly shaped fibers 14, has a thickness in the range from about 5 microns to about 15 microns and an actual length ranging from about 0.5 inches (12.7 mm) to about 2.0 inches (50.8 mm). Each coiled fiber 16 made of glass has at least one or more coil turns with outer diameters ranging from about 0.25 inches (6.35 mm) to about 1.0 inch (25.4 mm).

The reinforcement fibers 12 are bound together in the form of a sheet (not shown) by a polymeric binder system that can include a preliminary binder and a secondary binder. The preliminary binder is at least able to sufficiently bind together the reinforcement fibers 12 to enable the sheet to be subsequently processed in-line or wound into a roll for subsequent off-line processing into the non-woven fiber mat 10. The preliminary binders which can be used include thermoplastic-type polymeric binders in the form of particles (e.g., poly(vinyl alcohol) powder), in the form of fibers (e.g., made from a vinyl chloride copolymer or a copolyester) or a combination of both. These thermoplastic-type binders are at least partially fused to bond to the reinforcement fibers. The secondary binder ensures sufficient bonding between the reinforcement fibers 12 to provide the fiber mat 10 with substantial resistance to planar elongation while allowing a substantial degree of planar compressive movement. In addition to the actual examples of such a two-part binder system, disclosed below, it is believed that a fiber mat 10 which exhibits less resistance to planar compression will be obtained by binding together the present glass reinforcement fibers 12 in the same manner (i.e., with the same two-part binder systems) as the glass textile fibers disclosed in the U.S. Patent Application entitled WET-LAID NONWOVEN MAT AND A PROCESS FOR MAKING SAME, assigned to the same assignee as the present application, having the assignee's Case No. 23724A, and filed contemporaneously herewith, which is incorporated herein by reference in its entirety.

Alternatively, the polymeric binder system can be a single binder suitable for bonding together the reinforcement fibers 12 so as to make the fiber mat 10 a suitable substrate for reinforcing resilient sheet floor coverings, such as an interlayer for vinyl floor coverings. An example of a single binder system for binding fibers together is the elastomeric binder formed by removing water from an aqueous composition comprising a curable elastomer, such as that disclosed in U.S. Pat. No. 4,849,281, which is incorporated herein by reference in its entirety. It is believed that a fiber mat 10 which exhibits improved planar compressibility will also be obtained by binding together the present glass reinforcement fibers 12 in the same manner (i.e., with the same single binder systems) as the glass fiber blend (i.e., of glass wool and textile fibers) disclosed in the U.S. Pat. No. 4,849,281.

It is believed that the amount of the reinforcement fibers 12 in the fiber mat 10 will range from about 50% to about 95% by weight, and the amount of binder in the fiber mat 10 will range from about 5% (e.g., when only a single binder is used) to about 50% by weight (e.g., when two or more binders are used). The amount of reinforcement fibers 12 in the fiber mat 10 can range from about 50% to about 95% by weight, with the balance being the binder, even when the reinforcing fibers 12 are all glass fibers.

The fiber mats 10 of this invention can be made utilizing well known wet-laid non-woven technology. In each of the examples below, the fiber mat 10 is made by first chopping a plurality of the irregularly shaped glass fibers 14 with a 0.5 inch (12.7 mm) chopping interval to form randomly shaped reinforcement fibers 12 of irregular lengths (e.g., typically ranging from about 0.5 inches (12.7 mm) to about 2.0 inches (50.8 mm)). These randomly shaped glass reinforcing fibers 12 consist of the coiled fibers 16, the semi-coiled fibers 18 and the relatively straight or slightly curved fibers 20. The randomly shaped glass reinforcement fibers 12, along with any other type of reinforcing fibers desired, are mixed into an aqueous medium or slurry. The reinforcement fibers 12 are then withdrawn from the aqueous medium as a non-woven wet-laid base web or mat, for example, by dewatering the slurry according to any suitable process. Such processes are well known in that art and, therefore, are not described in detail herein. An example of a well known wet-laid non-woven process and equipment can be found in U.S. Pat. No. Re. 31,124, which is incorporated by reference herein in its entirety.

At least one thermoplastic-type or thermoset-type binder is applied to the glass reinforcement fibers 12. The wet-laid base mat is dried, and the binder is cured to form the non-woven fiber mat 10. The binder can be applied to the wet-formed base mat in any suitable manner, all of which methods are known in the art. The thermoplastic-type preliminary binder, in particle form, fiber form or both, is mixed in the slurry and heated, for example, during the drying of the wet-laid base mat, in order to at least partially fuse the particles and fibers to the reinforcement fibers 12. The secondary binder is applied to the reinforcement fibers, either before or after the wet-laid mat is initially dried. For example, the secondary binder can be sprayed on, or poured over the base mat and excess binder material removed by pulling a vacuum underneath the base mat.

The binder on the mat can be cured in any suitable manner sufficient to cure and, if necessary, dry the components of the binder and to produce a glass fiber mat 10 having the desirable hot tensile strength needed for manufacturing the mat 10 without compromising the desirable compressibility of the mat 10. The binder is cured by either causing a thermoset-type binder to crosslink and/or allowing a thermoplastic-type binder to solidify, as applicable. The drying and curing steps may either occur at different times or simultaneously.

The following examples set forth actual procedures for producing non-woven glass fiber mats 10 according to the present invention.

EXAMPLE 1

A slurry is formed by combining a white water solution with a preliminary binder and a quantity of glass reinforcement fibers 12 formed by chopping an amount of the irregularly shaped glass fibers 14 described above (i.e., disclosed in the U.S. patent application Ser. No. 08/310,183 discussed above). The white water solution is formed by combining 75 liters of a 0.35% solution of an anionic polyacrylamide viscosity modifier, such as that manufactured by Allied Colloids, of Suffolk, Va., under the product designation Percol 156, in a total volume of about 5000 liters of water to give a viscosity of 1.8 cps. A first mixing tank is charged with about 500 liters of the white water, 400 g of poly(vinyl alcohol) powder, as the preliminary binder and 3600 g of the irregularly shaped glass fibers 14 having a 12.5 mm chop length, as the reinforcement fibers. The mixture is stirred with mild agitation for 30 minutes and then transferred to a second mixing tank. An additional amount of the white water is added to bring the total volume to 2000 liters. The mixture is then stirred with more vigorous agitation for 5 minutes before the mixture is pumped to a conventional wet web forming machine. The flow of the resulting thick stock is regulated to form a base web or mat having a basis weight of 50 g/m$^2$ at a line speed of 30 ft/min. (9.1 m/min.). Excess moisture is removed by vacuum slots located along the forming section of the wet web forming machine, underneath a conventional wire conveyor carrying the base mat, according to well known techniques and with well known equipment. No additional binder is applied to the base mat on the saturator section. The resulting base mat is dried in an oven operating at a set point of 385° F. (196° C.). The dried base mat is strong enough to be wound into a roll at a take-up stand or further processed in-line into the non-woven fiber mat.

After the base mat is prepared in this manner, it is treated with a secondary binder by either unrolling or in-line directing the base mat onto the saturator section and applying the binder with a flooding weir. Excess binder is removed with vacuum slots so that the dry binder add-on is about 10 g/m$^2$. For this example, the secondary binder is a carboxylated styrene-butadiene latex, such as that manufactured by Dow Chemical, of Midland, Mich. under the product designation Dow Latex 485, that is modified with 2% by weight of a methylated melamine-formaldehyde resin, such as that manufactured by Cytec Industries, of West Paterson, N.J., under the product designation Cymel 327. The mat is dried and the binder cured in the oven at a temperature set point of 375° F. (191° C.) and a line speed of 30 ft/min (9.1 m/min.). Total binder solids are about 13%. The resulting non-woven glass fiber mat 10 is suitable for use as a substrate for the preparation of vinyl floor coverings.

EXAMPLE 2

The base mat in this example is prepared in the same manner as that in Example 1 above except that the first mixing tank is charged with 500 liters of the white water, a preliminary binder system of about 280 g of the poly(vinyl alcohol) powder and 1080 g of a vinyl chloride copolymer binder fiber, such as the type MP fiber manufactured by Wacker A G, of Munich, Germany, and 2640 g of the irregularly shaped glass fibers 14 having a 12.5 mm chop length. Before being deposited into the first mixing tank, the vinyl chloride binder fiber is pre-dispersed in a hydropulper (i.e., a high shear agitation system) with 60 liters of the white water for 1 minute. After the base mat is prepared in this manner, it is treated with a secondary binder, dried and cured as described above for Example 1 to produce another non-woven glass fiber mat 10 that is suitable for use as a substrate for the preparation of vinyl floor coverings.

EXAMPLE 3

The base mat in this example is prepared in the same manner as that in Example 2 above except that the first mixing tank is charged with 500 liters of the white water, a preliminary binder system of about 280 g of the poly(vinyl alcohol) powder and 600 g of the vinyl chloride binder fiber and 3120 g of the irregularly shaped glass fibers 14 having a 12.5 mm chop length. Before being deposited into the first mixing tank, the vinyl chloride binder fiber is pre-dispersed in the hydropulper with 60 liters of the white water for 1 minute. After the base mat is prepared in this manner, it is treated with a secondary binder, dried and cured as described above for Example 1 to produce another non-woven glass fiber mat 10 that is suitable for use as a substrate for the preparation of vinyl floor coverings.

EXAMPLE 4

The above Examples 1–3 involve drying the base web before a saturating secondary binder is applied. This Example involves direct saturation of the wet base web with a secondary binder. In this Example, 4000 g. of the irregularly shaped glass fibers 14, having a 12.5 mm chop length, is dispersed in 2000 liters of the white water without the addition of a preliminary binder. A mixture of 90% by weight of the carboxylated styrene-butadiene latex and 10% by weight of the methylated melamine-formaldehyde resin (mixed on a solids basis) is applied as the secondary binder to the wet mat at a total solids content of a about 15% by weight. After drying and curing the wet mat at an oven set point of 425° F. (218° C.), the resulting fiber mat 10 has a basis weight of 60 g/m$^2$, with 17% by weight of the binder add-on.

EXAMPLE 5

Another fiber mat 10 is prepared in a similar manner as that described in Example 4, except with the reinforcement fibers being a fiber blend of 3200 g of the irregularly shaped glass fibers 14, having a 12.5 mm chop length, and 800 g of 1.7 dtex×12.5 mm polyethylene terephthalate fibers, such as the type 100 fibers manufactured by Hoechst-Celanese, of Charlotte, N.C.

Randomly coiled and semi-coiled reinforcement fibers 12 may offer improved compressibility while providing improved strength and processability when substituted for the wool fibers in structures like those described in U.S. Pat. No. 4,849,281. This is especially true when the reinforcement fibers 12 are chopped sections of the irregularly shaped glass fibers 14 described above (i.e., disclosed in the U.S. patent application Ser. No. 08/310,183 incorporated by reference above). These chopped irregularly shaped glass fibers, when substituted in whole or in part, should also offer less resistance to planar compression than the fiber mat of glass textile fibers disclosed in the U.S. Patent Application entitled WET-LAID NONWOVEN MAT AND A PROCESS FOR MAKING SAME, being assigned to the same assignee as the present application, having the assignee's Case No. 23724A, being filed contemporaneously herewith, and which is incorporated by reference above.

From the above disclosure of the general principles of the present invention and the preceding detailed description, those skilled in this art will readily comprehend the various modifications to which the present invention is susceptible. For example, it is understood that the present invention is not necessarily limited to the use of reinforcement fibers made of glass, that it may be possible for some or all of the coiled or semi-coiled reinforcement fibers to be made from a non-glass material, and that it may be desirable for the present non-woven fiber mat to be used as a reinforcing layer in resilient sheet floor coverings other than vinyl floor coverings. Therefore, the scope of the invention should be limited only by the following claims and equivalents thereof.

What is claimed is:

1. A method for forming a non-woven fiber mat suitable for reinforcing, resilient sheet floor coverings, said method comprising the steps of:

separating a plurality of irregularly shaped fibers into randomly shaped fibers of irregular lengths;

providing a slurry of reinforcement fibers comprising at least the randomly shaped fibers;

forming the slurry into a non-woven wet-laid mat of the reinforcement fibers;

applying at least one binder to the reinforcement fibers;

drying the wet-laid mat; and curing the binder.

2. The method as set forth in claim 1, wherein said method further comprises the step of forming the plurality of irregularly shaped fibers from at least two different glasses having different coefficients of thermal expansion.

3. The method as set forth in claim 1, wherein said method further comprises the steps of:

forming the plurality of irregularly shaped fibers from at least two different glasses; and separating a plurality of at least one type of fiber from the group consisting of synthetic fibers, textile glass fibers and glass wool fibers into a plurality of shortened fibers, and said step of providing a slurry includes providing a slurry of reinforcement fibers further comprising a plurality of the shortened fibers.

4. The method as set forth in claim 1, wherein said step of applying a binder to the reinforcement fibers includes the steps of:

providing at least one thermoplastic-type polymeric binder in the slurry, where the preliminary binder is in the form of at least one of particles and fibers;

heating the preliminary binder so as to at least partially fuse the preliminary binder to the reinforcement fibers; and applying a curable secondary binder to the reinforcement fibers, wherein said step of drying the wet-laid mat includes drying the mat at least after the secondary binder is applied, and said step of curing the binder includes causing the binder to at least one of crosslink and solidify.

5. The method as set forth in claim 4, wherein said step of drying the wet-laid mat includes drying the mat only after the secondary binder is applied.

6. The method as set forth in claim 1, wherein said step of applying a binder to the reinforcement fibers further includes the step of applying a binder to the mat to bond together the reinforcement fibers so as to provide the fiber mat with substantial resistance to planar elongation and lesser resistance to planar compressive movement.

* * * * *